United States Patent Office 2,838,518
Patented June 10, 1958

2,838,518

ETHYNYL PIPERIDYL CARBAMIC ACID ESTERS

Wilhelm Schuler, Frankfurt am Main, Germany, assignor to Deutsche Gold- und Silber-Scheideanstalt vormals Roessler, Frankfurt am Main, Germany No Drawing. Application December 20, 1954
Serial No. 476,555

Claims priority, application Germany December 24, 1953

1 Claim. (Cl. 260—294.3)

The present invention relates to hydroxy-acetylenes carrying amino substituents and their process of preparation. The novel amino substituted hydroxy-acetylenes according to the invention are of therapeutic value in being practically harmless sedatives having special advantages in administration as well as their therapeutic action.

It is known that acetylene, which in medicine is also designated as Narzylene, possesses a narcotic effect. This effect of the ethynyl group has been used in a number of medicines which have been commercially available as sedatives and as hypnotics. The ethynyl compounds previously used for these purposes are mostly liquids and consequently had to be administered as a liquid or in gelatine capsules or they had to be converted into compounds capable of being tabletted. In many instances the ethynyl compounds have a strong characteristic odor which is disturbing to many persons to whom the medicines are administered and furthermore have a high vapor pressure which can cause disturbances after administration. Furthermore, administration of the previously known ethynyl group containing medicaments to test animals has shown that a more or less strong undesirable excitation stage generally precedes the induction of sleep.

It is an object of the present invention to provide novel ethynyl group containing compounds having a sedative action which avoid the disadvantages of the previously known compounds of this type.

In accordance with the invention it was found that novel amino substituted hydroxyacetylene and their derivatives could be obtained by reacting amino substituted ketones with acetylene or acetylene derivatives preferably in the presence of basically reacting condenseing reagents such as sodium, sodium amide, alkali metal hydroxides or hydrides, alkaline earth metal hydroxides or hydrides, and that such ethynyl compounds do not exhibit the aforementioned disadvantages. The novel compounds produced according to the invention are in general solid easily crystallized substances which can either be tabletted as such or in the form of their salts. It was furthermore found that the novel compounds when tested with animals would induce a state of sleep, during which the subject could still be spoken to, which was not preceded by a stage of excitation.

The toxicity of the novel ethynyl compounds is comparatively less than that of the known ethynyl compounds as the toxic and lethal doses are substantially higher than those of most of the previously known compounds. The basic amino group contained in the compounds according to the invention immediately forms the hydrochloric acid salt with the stomach acids. The compounds also can be administered in the form of the hydrochloric acid salts and when so administered have the same effect as the free bases. The hydrochloric acid salts, in view of their extremely low vapor pressures, avoid any difficulties as to odor and furthermore most of such salts are easily soluble in water so that a good resorbtion is permitted.

Preferably the compounds according to the invention are produced by reacting the amino ketones with the acetylenes, expediently in the absence of water in the presence of an inert solvent. Preferably amino ketones are employed which are strongly basic as the reaction proceeds more smoothly, the amino substituted hydroxyacetylenes produced have better properties and the production of salts is facilitated. Tertiary amino ketones have been found especially well suited, but as shown in the examples pyridyl ketones can also be employed in the production of sedative compounds according to the invention.

Other salts than the hydrochloric acid salts of the amino substituted hydroxyacetylenes already mentioned can be prepared by using other acids than hydrochloric acid. For example, the salts of hydrobromic acid or bromo-isovaleric acid can be prepared in which the sedative action of the amino substituted hydroxyacetylenes is increased by the presence of the acid component.

It is furthermore possible to block the free hydroxyl group of the novel ethynyl compounds according to the invention by esterification, such as, for example, by the production of the bromo-isovaleric acid ester, or by etherification.

The compounds according to the invention all contain a characteristic

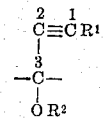

group in which one of the free valence bonds shown of carbon atom 3 is attached to a hydrocarbon radical carrying a basic nitrogen atom and the other is attached to an alkyl radical containing 1–3 carbon atoms or to a valence bond of an alkylene radical, the other valence bond of which is attached to the basic nitrogen atom carried by the first free valence bond of said carbon atom 3, and in which $R^1$ is hydrogen, alkyl with 1–6 carbon atoms or phenyl, and $R^2$ is hydrogen, benzahydryl or a carbamic acid ester radical including alkyl, phenyl or pyridyl substituted carbamic acid ester radicals.

The preferred compounds according to the invention have the following general formulae:

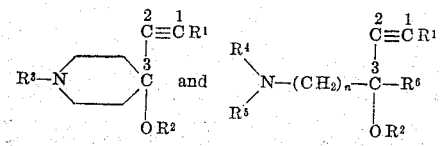

in which $R^1$ and $R^2$ have the same meaning as above, $R^3$, $R^4$ and $R^5$ are hydrogen or alkyl radicals containing 1–6 carbon atoms, and $R^6$ is an alkyl radical containing 1–3 carbon atoms and $n$ is an integer of from 1 to 4.

The process according to the invention can be employed in the production of amino substituted hydroxy ethynyl compounds from amino ketones of all types. While the process, for example, can be employed with amino ketones containing 1 to 3 keto groups per amino group, it is preferable to employ such amino ketones which contain 1 substituted or unsubstituted amino group per keto group.

The following examples will serve to illustrate several modifications of compounds according to the invention and their process of production.

*Example 1*

14.6 grams of finely powdered sodium amide and 100 cc. of ethyl ether were introduced into a 500 cc. three necked flask provided with a stirrer, reflux condenser and a dropping funnel. Thereafter 35.3 grams of dried 1 isopropyl-piperidone-4 were introduced drop by drop.

The mixture was gradually gently heated and then acetylene was introduced while shaking the mixture until the required amount of acetylene was taken up by the reaction mixture. The reaction product was then decomposed with water containing a small quantity of ice and the ethynyl base which was formed was taken up in benzene. The benzene solution was then dried with sodium sulfate, the benzene was distilled off and the ethynyl base was then distilled over under a reduced pressure of 12–13 mm./Hg at 118–119° C. The yield of 1-isopropyl-4-ethynyl-piperidol-4 was practically quantitative. The product after recrystallization has a melting point of 103° C. and has a good sedative action. Its formula is:

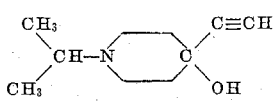

Example 2

In a method analogous to that described in Example 1, 2-dimethylamino-methyl-butynol-2 of the formula

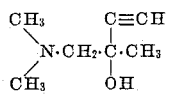

was prepared from dimethylamino acetone and acetylene. Its boiling point at 13 mm./Hg is 48–50° C., its melting point is 32.5–34.5° C. and the melting point of the hydrochloric acid salt is 136° C.

Example 3

In a manner analogous to that described in Example 1, 1-methylpiperidone-4 was reacted with acetylene to produce 1-methyl-4-ethynyl-piperidol-4 of the formula

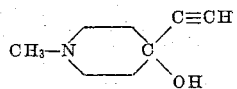

It had a boiling point at 160 mm./Hg of 201–203° C. and a melting point of 124–125° C. The melting point of its hydrochloride salt was 213° C.

The benzhydryl ether of such compound, namely, 1-methyl-4-ethynyl-piperidyl-benzahydryl ether was prepared. It has the following formula:

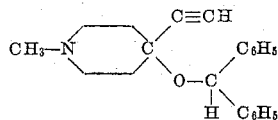

and has a boiling point at 2–3 mm./Hg of 201–203° C. The melting point of its hydrochloride salt was 213° C.

The phenyl carbamic acid ester of such compound, namely, 1 - methyl - 4 - ethynyl - piperidyl - phenyl - carbamic acid ester was also prepared.

It has the following formula:

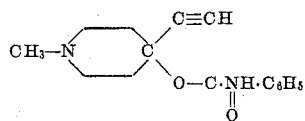

and has a melting point of 113–115° C. Furthermore, the α pyridyl carbamic ester, namely, 1-methyl-4-ethynyl-piperidyl-α-pyridyl carbamic acid ester, was prepared.

It has the following formula:

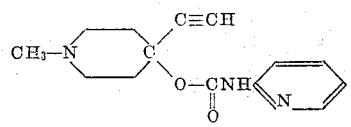

and has a boiling point at 3 mm./Hg of 200–205° C. and a melting point of 84–85° C. The melting point (with decomposition) of its hydrochloride salt is 220–230° C.

By replacing 1-methyl-piperidone-4 by the corresponding 1-ethyl, 1-propyl or 1-butyl substituted compounds and reacting with acetylene the corresponding 1 ethyl-, 1 propyl- or 1-butyl-4-ethynyl-piperidol-4 compounds were obtained and these were etherified to produce the corresponding benzhydryl ethers and esterified to produce the corresponding phenyl and pyridyl carbamic acid esters. The replacement of the 1-methyl group by 1-ethyl, 1-propyl or 1-butyl groups did not diminish the therapeutic activity of the compounds.

The 1-ethyl-4-ethynyl-piperidol-4 had a boiling point at 13 mm./Hg. of 115° C. and a melting point of 87–88° C. Its hydrochloride salt had a melting point of 144.5–146° C.

The 1-n-propyl-4-ethynyl-piperidol-4 had a boiling point at 13 mm./Hg. of 122° C. and a melting point of 59° C. and the melting point of its hydrochloride salt was 183–184° C.

The 1-n-butyl-4-ethynyl-piperidol-4 had a boiling point of 13 mm./Hg of 132–133° C. and its hydrochloride salt had a melting point of 173–174° C.

Example 4

In a manner analogous to that described in Example 1, 1-ethyl-piperidone-4 was reacted with methyl acetylene to produce 1-ethyl-4-propynyl-piperidol-4 of the formula

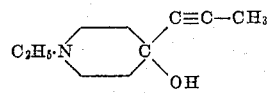

It had a boiling point at 12 mm./Hg of 119° C.

Example 5

In a manner analogous to that described in Example 1, dimethylamino acetone was reacted with phenyl acetylene to produce 2-dimethylaminomethyl-4-phenyl-butynol-2 of the formula

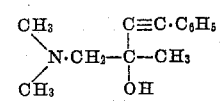

It had a boiling point at 10–12 mm./Hg of 132–137° C. and the melting point of its hydrochloride salt was 114–115.5° C.

Example 6

In a manner analogous to that described in Example 1, dimethylaminopropyl-methyl ketone was reacted with acetylene to produce 6-dimethylamino-3-methyl-hexyne-1-ol-3 of the formula

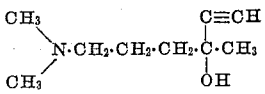

It had a boiling point at 30 mm./Hg of 107–108° C. and the melting point of its hydrochloride salt was 117–118° C.

Example 7

In a manner analogous to that described in Example 1, β-pyridylmethylketone was reacted with acetylene to produce 3β-pyridyl-butyn-1-ol-3.

It had a boiling point at 12 mm./Hg of 91–92° C. and the melting point of its hydrochloric acid salt was 178° C.

All of the compounds described in the above examples have very similar therapeutic properties and a good sedative action.

The esters and ethers as disclosed in Example 3 may be manufactured as follows:

(a) 1 - methyl - 4 - ethynyl - piperidol - 4 - benzhydryl ether.—4 parts of 1-methyl-4-ethynyl-piperidol-4 and 7.1 parts of diphenyl methyl bromide were introduced into 20 parts of benzene. The mixture was allowed to stand for a period of 24 hours. The benzene was then distilled off and the residue for 50 minutes heated to a temperature of about 160° C. The reaction product was then mixed with water, alkalinized and extracted with benzene. The benzene containing solution was shaken with a 5% hydrochloric acid and the thus obtained aqueous hydrochloric solution made alkaline with soda lye and afterwards shaken with ether. The ether was distilled off and the residue distilled in vacuo. The 1-methyl-4-ethynyl-piperidol-4-benzahydryl ether was distilled over at a pressure of 2 mm./Hg.

(b) *1 - methyl-4-ethynyl - piperidol-4-phenyl carbamic acid ester.*—4 parts of 1-methyl-4-ethynyl-piperidol-4 and 4.16 parts of phenyl isocyanate were mixed in a flask and heated to a temperature of about 110° C. At this temperature a strong reaction took place whereby the temperature of the reaction mixture raised to about 200° C. After completion of the reaction the reaction product was distilled in vacuo. The phenyl carbamic acid ester was distilled off at a pressure of 2 mm./Hg and at a temperature of about 166° C. The yield was practically quantitative. The corresponding hydrochloric salt had a melting point of 267–268° C.

In reacting calcium bromide or calcium chloride with the amino substituted hydroxy acetylenes and especially with their carbamic acid esters complex compounds with an excellent sedative action may be obtained. These compounds may be recovered by putting a layer of the solution of the bases onto the calcium bromide.

I claim:

A compound selected from the group consisting of compounds having the general formula

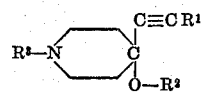

in which $R^1$ is a radical selected from the group consisting of hydrogen, alkyl, containing from 1 to 6 carbon atoms and phenyl radicals, $R^2$ is a carbamic acid ester radical selected from the group consisting of the phenyl carbamic acid ester radical and the pyridyl carbamic acid ester radical and $R^3$ is an alkyl radical containing from 1 to 6 carbon atoms and the therapeutically useful addition salts thereof with acids.

References Cited in the file of this patent

UNITED STATES PATENTS

| | | |
|---|---|---|
| 2,415,834 | Milas | Feb. 18, 1947 |
| 2,483,347 | Milas | Sept. 27, 1949 |

FOREIGN PATENTS

| | | |
|---|---|---|
| 232,206 | Great Britain | Feb. 18, 1926 |

OTHER REFERENCES

Domenick et al.: Arch. Biochem. Biophys., vol. 33, August 1951–February 1952, pages 482–3.

Margolin et al.: Science, vol. 114, July–December 1951, page 384.